US012574143B2

(12) United States Patent
Nam et al.

(10) Patent No.: US 12,574,143 B2
(45) Date of Patent: Mar. 10, 2026

(54) DYNAMIC PAGING MODE ADAPTATION

(71) Applicant: QUALCOMM Incorporated, San Diego, CA (US)

(72) Inventors: Wooseok Nam, San Diego, CA (US); Tao Luo, San Diego, CA (US); Peter Gaal, San Diego, CA (US); Linhai He, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 17/302,793

(22) Filed: May 12, 2021

(65) Prior Publication Data

US 2021/0409147 A1 Dec. 30, 2021

Related U.S. Application Data

(60) Provisional application No. 63/043,981, filed on Jun. 25, 2020.

(51) Int. Cl.
| | |
|---|---|
| *H04L 1/00* | (2006.01) |
| *H04W 24/08* | (2009.01) |
| *H04W 68/00* | (2009.01) |
| *H04W 74/0833* | (2024.01) |
| *H04W 76/11* | (2018.01) |
| *H04W 74/0836* | (2024.01) |

(52) U.S. Cl.
CPC ........... *H04L 1/0025* (2013.01); *H04W 24/08* (2013.01); *H04W 68/005* (2013.01); *H04W 74/0833* (2013.01); *H04W 76/11* (2018.02); *H04W 74/0836* (2024.01)

(58) Field of Classification Search
CPC ..................................................... H04L 1/0025
See application file for complete search history.

(56) References Cited

U.S. PATENT DOCUMENTS

| | | | | |
|---|---|---|---|---|
| 8,442,560 | B1 * | 5/2013 | Kiraly ................. | H04W 68/025 |
| | | | | 455/515 |
| 9,137,849 | B1 * | 9/2015 | Wright .................. | H04W 76/14 |
| 9,313,822 | B2 * | 4/2016 | Thangella ............... | G06F 3/038 |
| 9,591,683 | B2 * | 3/2017 | Cao ......................... | H04W 88/04 |
| 10,091,763 | B2 * | 10/2018 | Bergman .............. | H04L 1/1812 |
| 11,051,238 | B2 * | 6/2021 | Tao ........................ | H04W 76/11 |
| 11,284,470 | B2 * | 3/2022 | Dhanda ............. | H04W 52/0229 |
| 2010/0240400 | A1 * | 9/2010 | Choi ...................... | H04W 68/02 |
| | | | | 455/458 |

(Continued)

*Primary Examiner* — Guang W Li

(74) *Attorney, Agent, or Firm* — QUALCOMM Incorporated

(57) ABSTRACT

Various aspects of the present disclosure generally relate to wireless communication. In some aspects, a user equipment may receive first signaling identifying a first mode for a network communication procedure, wherein the network communication procedure includes at least one of a paging procedure or a random access channel procedure; receive second signaling associated with the network communication procedure, in accordance with the first mode, that indicates a switch to a second mode for the network communication procedure; and perform the switch to using the second mode for the network communication procedure. Numerous other aspects are provided.

30 Claims, 5 Drawing Sheets

(56)            References Cited

U.S. PATENT DOCUMENTS

| | | | |
|---|---|---|---|
| 2012/0189077 A1* | 7/2012 | Seo | H04B 7/024 |
| | | | 375/267 |
| 2014/0162705 A1* | 6/2014 | De Wit | H04W 4/20 |
| | | | 455/458 |
| 2015/0098366 A1* | 4/2015 | Wu | H04L 5/0035 |
| | | | 370/278 |
| 2016/0135141 A1* | 5/2016 | Burbidge | H04W 68/02 |
| | | | 455/458 |
| 2016/0205659 A1* | 7/2016 | Bergman | H04W 72/51 |
| | | | 370/252 |
| 2018/0070282 A1* | 3/2018 | Su | H04L 1/0001 |
| 2018/0124685 A1* | 5/2018 | Jha | H04W 68/02 |
| 2019/0075598 A1* | 3/2019 | Li | H04W 74/0833 |
| 2019/0123814 A1* | 4/2019 | Martin | H04L 69/14 |
| 2020/0092818 A1* | 3/2020 | Jiang | H04W 52/0261 |
| 2020/0107369 A1* | 4/2020 | Jeon | H04W 74/006 |
| 2020/0196279 A1* | 6/2020 | Thomas | H04W 72/04 |
| 2020/0205052 A1* | 6/2020 | Su | H04W 72/21 |
| 2020/0275410 A1* | 8/2020 | Kodaypak | H04W 68/02 |
| 2021/0105787 A1* | 4/2021 | Park | H04L 43/16 |
| 2021/0409147 A1* | 12/2021 | Nam | H04L 1/0025 |
| 2022/0141887 A1* | 5/2022 | Ahn | H04W 4/70 |
| | | | 370/329 |
| 2023/0269656 A1* | 8/2023 | Akl | H04W 88/04 |
| | | | 370/254 |

* cited by examiner

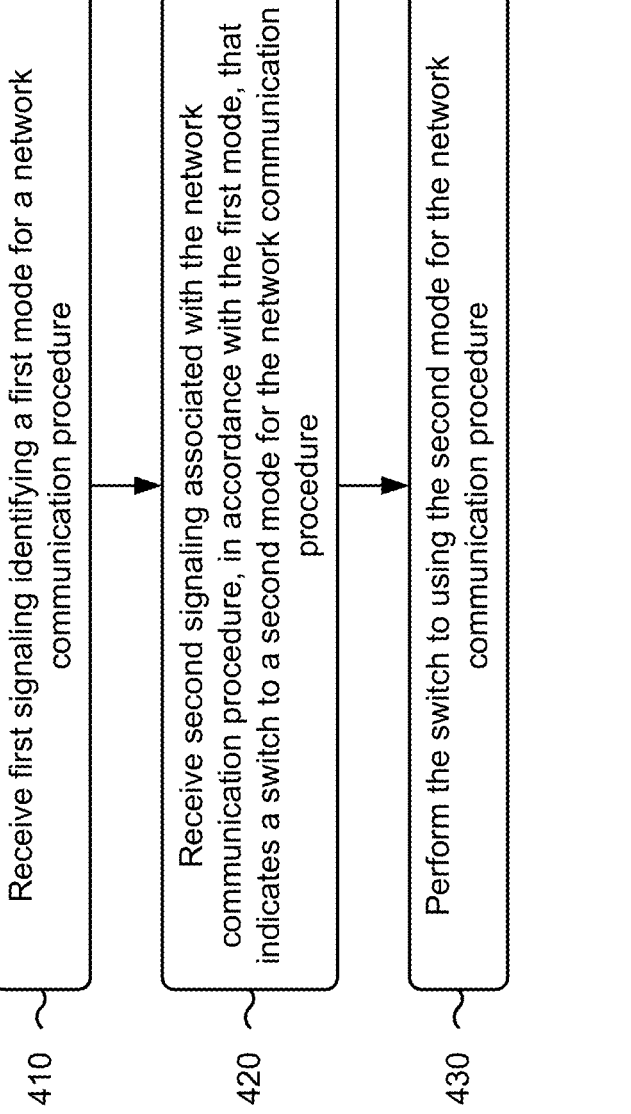

410  Receive first signaling identifying a first mode for a network communication procedure 420  Receive second signaling associated with the network communication procedure, in accordance with the first mode, that indicates a switch to a second mode for the network communication procedure 430  Perform the switch to using the second mode for the network communication procedure

DYNAMIC PAGING MODE ADAPTATION

CROSS-REFERENCE TO RELATED APPLICATION

This patent application claims priority to U.S. Provisional Patent Application No. 63/043,981, filed on Jun. 25, 2020, entitled "DYNAMIC PAGING MODE ADAPTATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dynamic paging mode adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of s Such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving first signaling identifying a first mode for a network communication procedure, wherein the network communication procedure includes at least one of a paging procedure or a random access channel procedure; receiving second signaling associated with the network communication procedure, in accordance with the first mode, that indicates a switch to a second mode for the network communication procedure; and performing the switch to using the second mode for the network communication procedure.

In some aspects, a non-transitory computer-readable medium storing a set of instructions for wireless communication includes one or more instructions that, when executed by one or more processors of a user equipment (UE), cause the UE to receive first signaling identifying a first mode for a network communication procedure, wherein the network communication procedure includes at least one of a paging procedure or a random access channel procedure; receive second signaling associated with the network communication procedure, in accordance with the first mode, that indicates a switch to a second mode for the network communication procedure; and perform the switch to using the second mode for the network communication procedure.

In some aspects, a user equipment (UE) for wireless communication includes a memory; and one or more processors operatively coupled to the memory, the memory and the one or more processors configured to receive first signaling identifying a first mode for a network communication procedure, wherein the network communication procedure includes at least one of a paging procedure or a random access channel procedure; receive second signaling associated with the network communication procedure, in accordance with the first mode, that indicates a switch to a second mode for the network communication procedure; and perform the switch to using the second mode for the network communication procedure.

In some aspects, an apparatus for wireless communication includes means for receiving first signaling identifying a first mode for a network communication procedure, wherein the network communication procedure includes at least one of a paging procedure or a random access channel procedure; means for receiving second signaling associated with the network communication procedure, in accordance with the first mode, that indicates a switch to a second mode for the network communication procedure; and means for performing the switch to using the second mode for the network communication procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process associated with dynamic paging mode adaptation, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or new radio (NR) radio access technology (RAT), aspects of the present disclosure can be applied to other RATs, such as a 3G RAT, a 4G RAT, and/or a RAT subsequent to 5G (e.g., 6G).

Figure 1:
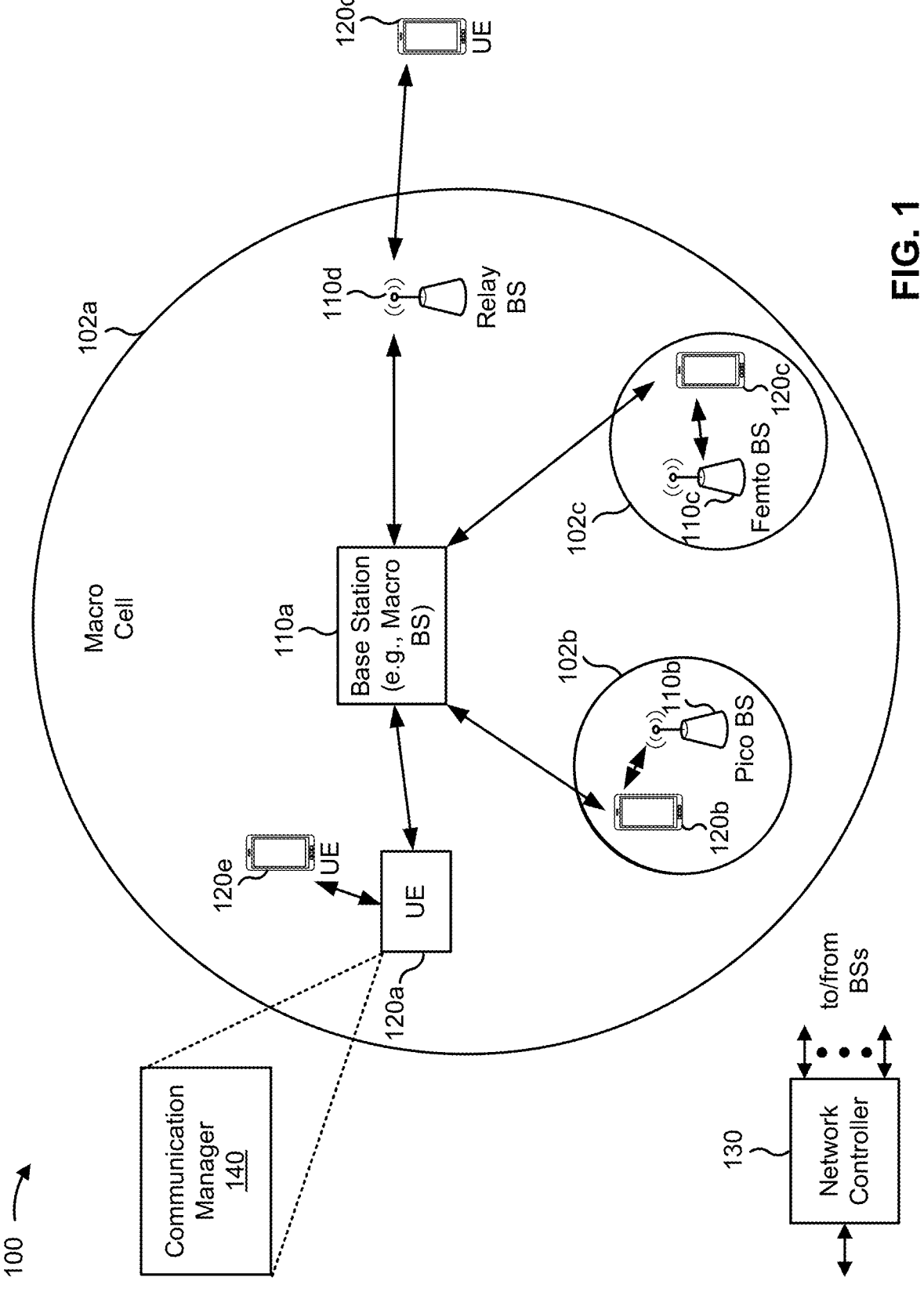
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive first signaling identifying a first mode for a network communication procedure, wherein the network communication procedure includes at least one of a paging procedure or a random access channel procedure; receive second signaling associated with the network communication procedure, in accordance with the first mode, that indicates a switch to a second mode for the network communication procedure; and perform the switch to using the second mode for the network communication procedure. Additionally, or alternatively, the communication manager 140 may perform one or more other operations described herein.

As indicated above, FIG. 1 is provided as an example. Other examples may differ from what is described with regard to FIG. 1.

Figure 2:
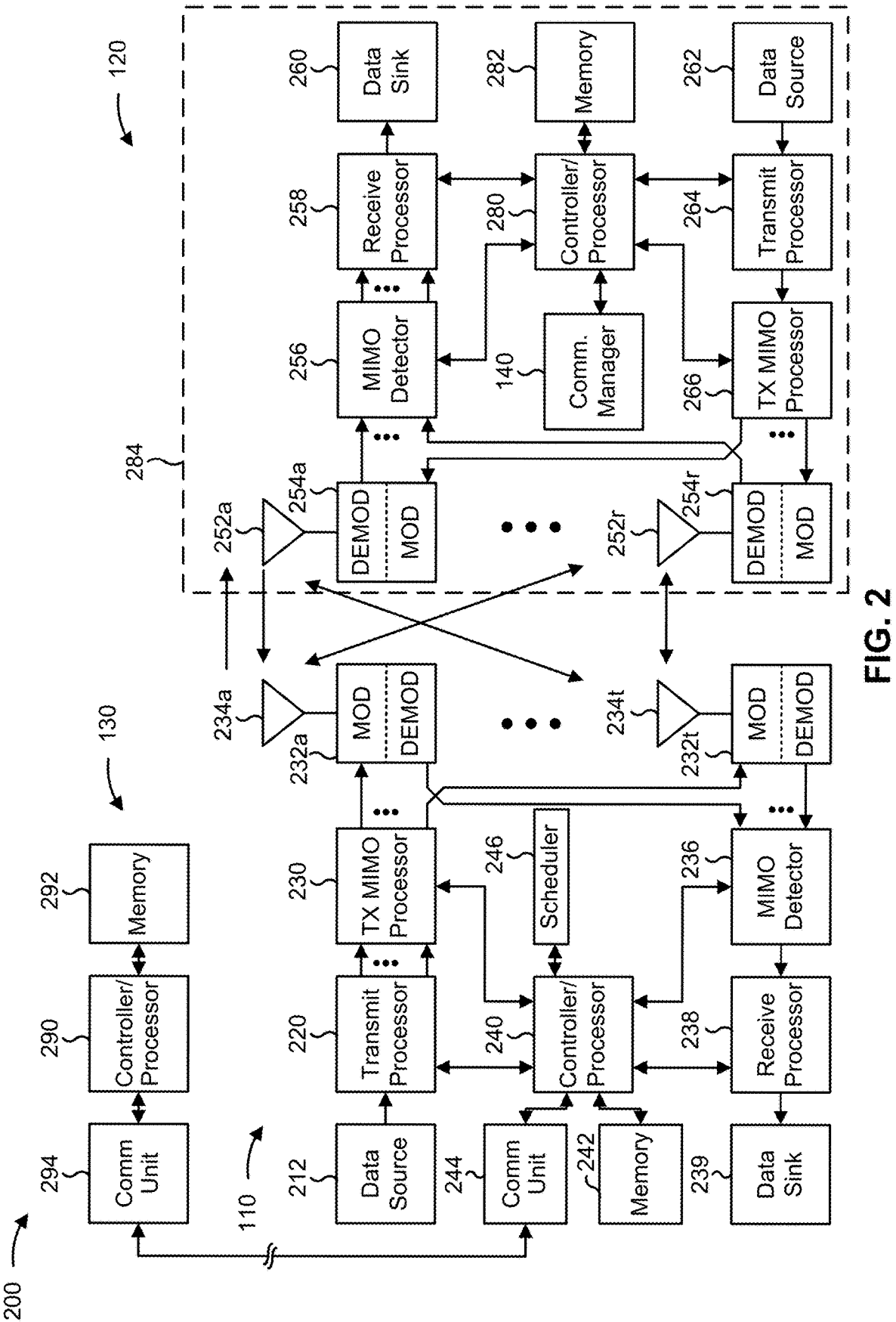
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-4.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-4.

Controller/processor 240 of base station 110, controller/processor 280 of UE 120, and/or any other component(s) of FIG. 2 may perform one or more techniques associated with a dynamic paging mode, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions, among other examples.

In some aspects, UE 120 may include means for receiving first signaling identifying a first mode for a network communication procedure, wherein the network communication procedure includes at least one of a paging procedure or a random access channel procedure; means for receiving second signaling associated with the network communication procedure, in accordance with the first mode, that indicates a switch to a second mode for the network communication procedure; means for performing the switch to using the second mode for the network communication procedure; or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, a BS may transmit paging via a paging physical downlink control channel (PDCCH) with a paging radio network temporary identifier (P-RNTI). A first UE may detect the paging and may decode an associated paging message of a physical downlink shared channel (PDSCH) to determine whether the paging is addressed to the first UE (or is addressed to another, second UE). However, when the paging is addressed to the second UE, the first UE may have unnecessarily used power resources for decoding the paging message. As a result, some BSs may provide power savings enhancements by using relatively small paging groups, each with different P-RNTIs. In this case, a UE is less likely to decode a paging message addressed to another UE than may occur when a paging group has a larger quantity of UEs using the same P-RNTI. Another technique may include the BS transmitting paging downlink control information (DCI) with a group identifier to enable the UE to determine whether paging relates to a group of UEs to which the UE is assigned.

As a further enhancement, some BSs may assign different P-RNTIs to each UE, rather than having a plurality of UEs share a P-RNTI in a paging group. In this case, a first UE and a second UE may each monitor a common paging occasion, but may only attempt to decode paging messages associated with their respective P-RNTIs. In this case, when a BS transmits, for example, a paging DCI, the BS may address the paging DCI to a P-RNTI rather than to a UE, but the UE may use the P-RNTI to determine that the paging DCI is intended for the UE based at least in part on each UE having a different P-RNTI. Additionally, or alternatively, the BS may also use differential assignment of time or frequency resources, paging occasions, and/or the like to reduce a likelihood that a UE attempts to decode a paging message that is intended for another UE.

However, assigning P-RNTIs to smaller, more numerous paging groups or to each UE individually may result in excessive network overhead, excessive utilization of paging resources, and/or the like. Moreover, as a quantity of assigned P-RNTIs increases, a paging PDCCH blocking rate may also increase, which may result in increased paging delay. Furthermore, as a result of using additional network resources for assigning more P-RNTIs, a network throughput for data traffic may decrease.

Some aspects described herein enable dynamic adaptation of paging resources. For example, a UE may receive a system information block (SIB) (e.g., a SIB type-1 (SIB1)) identifying a support for different types of paging modes (e.g., with different quantities of assigned P-RNTIs, different resource allocations, and/or the like). The UE may initially monitor a first paging mode, of the different types of paging modes, and, during monitoring of the first paging mode, receive signaling indicating a switch to a second paging mode of the different types of paging modes. In this way, the BS may dynamically adapt a configuration for paging based at least in part on a paging rate, a blocking rate, and/or the like. Moreover, based at least in part on dynamically adapting the configuration for paging, the UE and the BS enable a reduction of network overhead when, for example, a threshold amount of data traffic is to be transmitted, and a use of additional P-RNTIs to avoid excess utilization of UE power resources when less than a threshold amount of data traffic is to be transmitted.

Figure 3:
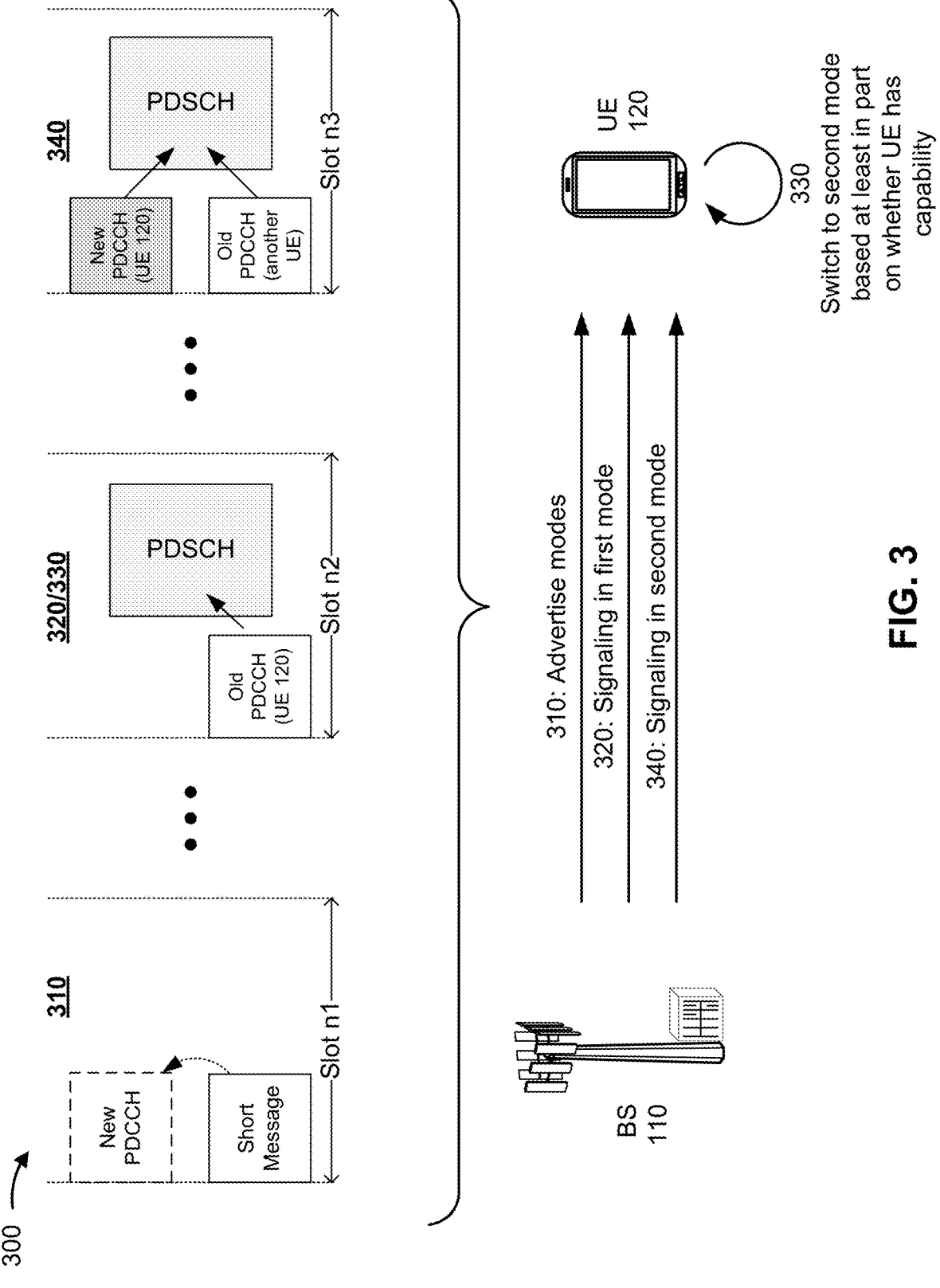
FIG. 3 is a diagram illustrating an example associated with dynamic paging mode adaptation, in accordance with the present disclosure.

FIG. 3 is a diagram illustrating an example 300 associated with dynamic paging mode adaptation, in accordance with various aspects of the present disclosure. As shown in FIG. 3, example 300 includes communication between a BS 110 and a UE 120. In some aspects, BS 110 and UE 120 may be included in a wireless network such as wireless network 100. BS 110 and UE 120 may communicate on a wireless access link, which may include an uplink and a downlink.

As further shown in FIG. 3, and by reference number 310, BS 110 may advertise a set of communication modes to UE 120. For example, UE 120 may receive a system information block (SIB) (e.g., a SIB type-1 (SIB1)) identifying a set of paging modes that are available for use when communicating with BS 110. In some implementations, UE 120 may receive information identifying one or more parameters of a communication mode. For example, for a paging mode, UE 120 may receive information identifying a set of P-RNTIs, a set of time resources, a set of frequency resources, a set of paging occasions, a set of repetition factors, and/or the like for one or more different paging modes. Additionally, or alternatively, UE 120 may receive information identifying an initial communication mode. For example, UE 120 may receive information identifying a default paging mode, a fallback paging mode, a default or fallback P-RNTI, and/or the like. In some aspects, UE 120 may store information identifying a default or fallback communication mode and/or a parameter thereof.

As further shown in FIG. 3, and by reference number 320, UE 120 may receive signaling in the first communication mode. For example, UE 120 may receive information from BS 110 using a first paging mode. In some aspects, UE 120 may receive in connection with the signaling in the first communication mode, an indication to switch to a second communication mode. For example, UE 120 may receive a paging DCI associated with a first paging mode and the paging DCI may include an indicator of a switch to a second paging mode for subsequent paging. In this case, the paging DCI may include a field dedicated for signaling a communication mode switch. Additionally, or alternatively, UE 120 may receive a short message associated with the first communication mode that signals a switch to the second communication mode. For example, UE 120 may parse the short message to identify a bit indicator of a switch from the first paging mode to the second paging mode. In this case, the bit indicator may indicate a switch to a selected second paging mode of, for example, a plurality of possible second paging modes indicated in the SIB 1.

In some aspects, the switch to the second communication mode may be based at least in part on a network parameter. For example, BS 110 may determine to transmit the first signaling to cause a switch to the second paging mode based at least in part on a paging rate, a blocking rate, a paging delay, and/or the like. Additionally, or alternatively, BS 110 may cause a switch with regard to another type of communication mode. For example, BS 110 may transmit the first signaling to cause a switch with regard to an idle mode procedure, an inactive mode procedure, a random access channel (RACH) mode procedure (e.g., a switch between 2-step RACH and 4-step RACH), and/or the like. In some aspects, when a plurality of types of communication mode switches are enabled, UE 120 may receive, for example, a short message with an indicator of which type of communication mode is to switch modes.

As further shown in FIG. 3, and by reference numbers 330 and 340, UE 120 may switch to using a second communication mode and may receive second signaling associated with the second communication mode. For example, UE 120 may switch to monitoring in a paging occasion associated with a second paging mode and may receive paging in the paging occasion associated with the second paging mode. In this way, UE 120 and BS 110 enable dynamic communication mode switching to adapt to changing network conditions. In some aspects, UE 120 monitors a different paging occasion than one or more other UEs 120 based at least in part on the switch to the second paging mode. For example, when a first UE 120 and a second UE 120 initially monitor a common PDCCH, and the first UE 120 receives first signaling to switch to a second paging mode, the first UE 120 and second UE 120 may, at a subsequent time, monitor respective PDCCHs. In this case, the respective PDCCHs may be associated with a common PDSCH.

In some aspects, UE 120 may fail to receive the first signaling associated with triggering the switch to using the second communication mode. For example, BS 110 may transmit paging in the first paging mode, but interference may result in UE 120 failing to receive the paging. In this case, UE 120 may use an error handling procedure to manage communication with BS 110. For example, UE 120 may monitor for a short message with a default (e.g., legacy) type of P-RNTI regardless of a paging mode that UE 120 is using as the first paging mode. In this case, even when UE 120 misses first signaling in the first paging mode, UE 120 may receive another instance of the first signaling in the default paging mode based at least in part on monitoring for the default type of P-RNTI. In this case, UE 120 may switch to the second paging mode based at least in part on receiving the other instance of first signaling. Similarly, when using the second paging mode, UE 120 may continue to monitor for the default type of P-RNTI to enable a switch back to, for example, the first paging mode.

Additionally, or alternatively, BS 110 may transmit a paging message (e.g., a PDSCH) in both a first paging mode and a second paging mode. In this case, when UE 120 misses the first signaling in the first paging mode triggering a switch to the second paging mode, UE 120 may still receive subsequent signaling in the first paging mode signaling use of the same PDSCH as UE 120 would have received in the second paging mode. Additionally, or alternatively, UE 120 may use a timer to trigger a fallback mode. For example, when UE 120 does not receive a paging DCI or short message for a threshold period of time, UE 120 may determine that paging mode switch signaling has been missed and may fall back to a fallback paging mode. In this case, UE 120 may receive paging and/or a paging switch indication in the fallback paging mode, thereby avoiding subsequent missed communication with BS 110.

As indicated above, FIG. 3 is provided as an example. Other examples may differ from what is described with respect to FIG. 3.

FIG. 4 is a diagram illustrating an example process 400 performed, for example, by a UE, in accordance with various aspects of the present disclosure. Example process 400 is an example where the UE (e.g., UE 120 and/or the like) performs operations associated with dynamic paging mode adaptation.

As shown in FIG. 4, in some aspects, process 400 may include receiving first signaling identifying a first mode for a network communication procedure, wherein the network communication procedure includes at least one of a paging procedure or a random access channel procedure (block 410). For example, the UE (e.g., using receive processor 258, transmit processor 264, controller/processor 280, memory 282, and/or the like) may receive first signaling identifying a first mode for a network communication procedure, as described above. In some aspects, the network communication procedure includes at least one of a paging procedure or a random access channel procedure.

As further shown in FIG. 4, in some aspects, process 400 may include receiving second signaling associated with the network communication procedure, in accordance with the first mode, that indicates a switch to a second mode for the network communication procedure (block 420). For example, the UE (e.g., using receive processor 258, transmit processor 264, controller/processor 280, memory 282, and/or the like) may receive second signaling associated with the network communication procedure, in accordance with the first mode, that indicates a switch to a second mode for the network communication procedure, as described above.

As further shown in FIG. 4, in some aspects, process 400 may include performing the switch to using the second mode for the network communication procedure (block 430). For example, the UE (e.g., using receive processor 258, transmit processor 264, controller/processor 280, memory 282, and/ or the like) may perform the switch to using the second mode for the network communication procedure, as described above.

Process 400 may include additional aspects, such as any single aspect or any combination of aspects described below and/or in connection with one or more other processes described elsewhere herein.

In a first aspect, process 400 includes determining that a threshold period of time has elapsed for receiving a paging downlink control information or a short message; and falling back to the first mode.

In a second aspect, alone or in combination with the first aspect, process 400 includes receiving, in a system information block, information identifying support for the second mode for the network communication procedure.

In a third aspect, alone or in combination with one or more of the first and second aspects, the first mode and the second mode differ with regard to at least one of: a set of paging radio network temporary identifiers, a set of time resources, a set of frequency resources, a set of paging occasions, a random access procedure type, a random access channel occasion configuration, a random access channel parameter, a set of paging sub-groups, or a repetition parameter for a paging beam.

In a fourth aspect, alone or in combination with one or more of the first through third aspects, process 400 includes monitoring a paging radio network temporary identifier for a paging message or a short message to receive the first signaling.

In a fifth aspect, alone or in combination with one or more of the first through fourth aspects, the first signaling is a downlink control information or a short message that includes a bit indicator identifying the second mode.

In a sixth aspect, alone or in combination with one or more of the first through fifth aspects, the switch to the second mode is based at least in part on at least one of a paging rate, a blocking rate, or a paging delay.

In a seventh aspect, alone or in combination with one or more of the first through sixth aspects, process 400 includes monitoring for a paging radio network temporary identifier associated with the first mode when using the second mode.

In an eighth aspect, alone or in combination with one or more of the first through seventh aspects, the first mode and the second mode are associated with a common paging message in a downlink shared channel.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
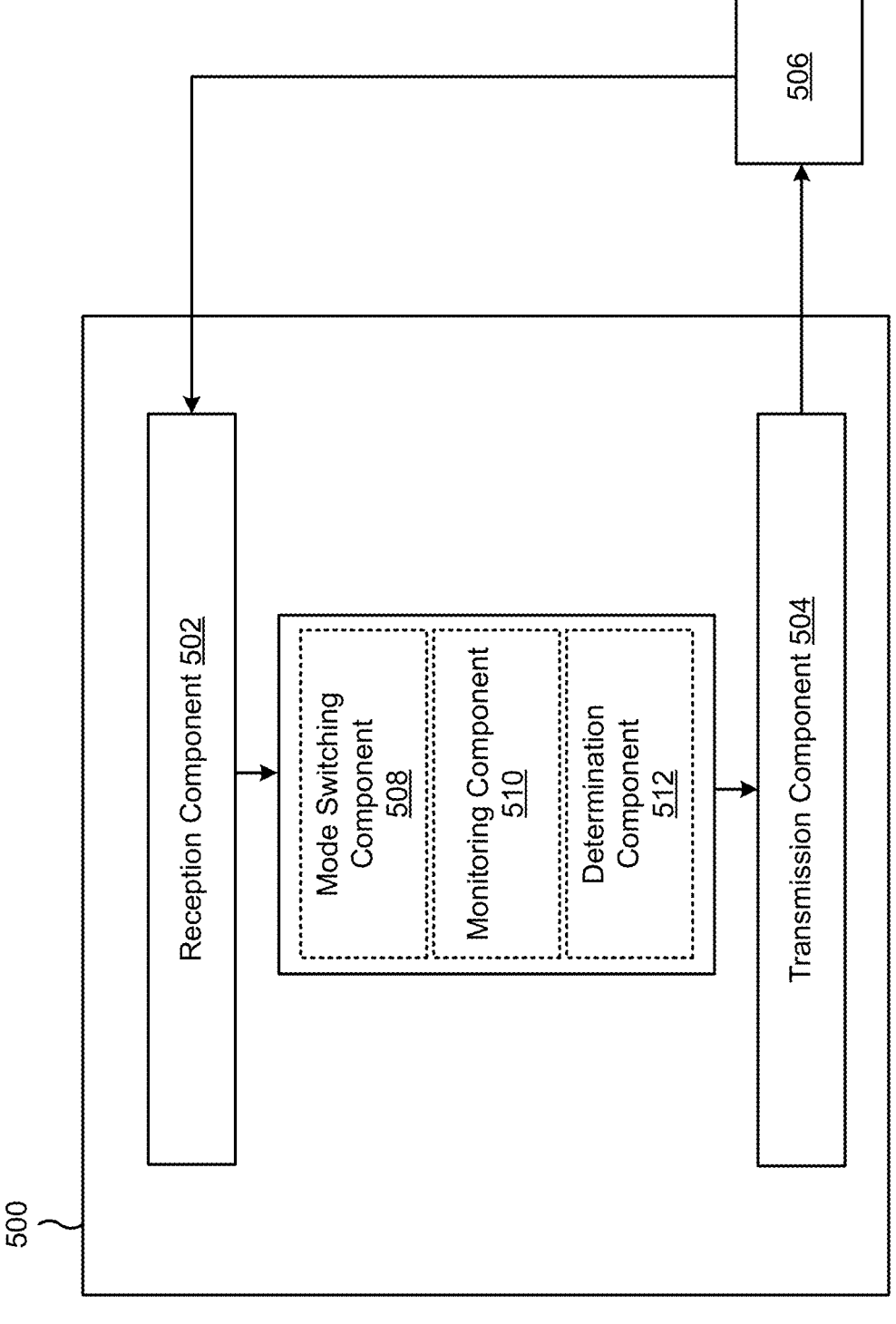
FIG. 5 is a block diagram of an example apparatus for wireless communication, in accordance with the present disclosure.

FIG. 5 is a block diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include one or more of a mode switching component 508, a monitoring component 510, or a determination component 512, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described above in connection with FIG. 2. Additionally, or alternatively, one or more components shown in FIG. 5 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a demodulator, a MIMO detector, a receive processor, a controller/processor, a memory, or a combination thereof, of the UE described above in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modulator, a transmit MIMO processor, a transmit processor, a controller/processor, a memory, or a combination thereof, of the UE described above in connection with FIG. 2. In some aspects, the transmission component 504 may be co-located with the reception component 502 in a transceiver.

The reception component 502 may receive first signaling identifying a first mode for a network communication procedure. The reception component 502 may receive second signaling associated with the network communication procedure, in accordance with the first mode, that indicates a switch to a second mode for the network communication procedure. The mode switching component 508 may perform the switch to using the second mode for the network communication procedure.

The reception component 502 may receive, in a system information block, information identifying support for the second mode for the network communication procedure. The monitoring component 510 may monitor a paging radio network temporary identifier for a paging message or a short message to receive the first signaling. The monitoring component 510 may monitor for a paging radio network temporary identifier associated with the first mode when using the second mode. The determination component 512 may determine that a threshold period of time has elapsed for receiving a paging downlink control information or a short message. The mode switching component 508 may fall back to the first mode.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a user equipment (UE), comprising: receiving first signaling identifying a first mode for a network communication procedure; receiving second signaling associated with the network communication procedure, in accordance with the first mode, that indicates a switch to a second mode for the network communication procedure; and performing the switch to using the second mode for the network communication procedure.

Aspect 2: The method of Aspect 1, wherein the network communication procedure is at least one of: a paging procedure or a random access channel procedure.

Aspect 3: The method of Aspect 1, further comprising: receiving, in a system information block, information identifying support for the second mode for the network communication procedure.

Aspect 4: The method of Aspect 1, wherein the first mode and the second mode differ with regard to at least one of: a set of paging radio network temporary identifiers, a set of time resources, a set of frequency resources, a set of paging occasions, a random access procedure type, a random access channel occasion configuration, a random access channel parameter, or a repetition parameter for a paging beam.

Aspect 5: The method of Aspect 1, further comprising: monitoring a paging radio network temporary identifier for a paging message or a short message to receive the first signaling.

Aspect 6: The method of Aspect 1, wherein the first signaling is a downlink control information or a short message that includes a bit indicator identifying the second mode.

Aspect 7: The method of Aspect 1, wherein the switch to the second mode is based at least in part on at least one of a paging rate, a blocking rate, or a paging delay.

Aspect 8: The method of Aspect 1, further comprising: monitoring for a paging radio network temporary identifier associated with the first mode when using the second mode.

Aspect 9: The method of Aspect 1, wherein the first mode and the second mode are associated with a common paging message in a downlink shared channel.

Aspect 10: The method of Aspect 1, further comprising: determining that a threshold period of time has elapsed for receiving a paging downlink control information or a short message; and falling back to the first mode.

Aspect 11: An apparatus for wireless communication at a device, comprising a processor; memory coupled with the processor; and instructions stored in the memory and executable by the processor to cause the apparatus to perform the method of one or more Aspects of Aspects 1-10.

Aspect 12: A device for wireless communication, comprising a memory and one or more processors coupled to the memory, the memory and the one or more processors configured to perform the method of one or more Aspects of Aspects 1-10.

Aspect 13: An apparatus for wireless communication, comprising at least one means for performing the method of one or more Aspects of Aspects 1-10.

Aspect 14: A non-transitory computer-readable medium storing code for wireless communication, the code comprising instructions executable by a processor to perform the method of one or more Aspects of Aspects 1-10.

Aspect 15: A non-transitory computer-readable medium storing a set of instructions for wireless communication, the set of instructions comprising one or more instructions that, when executed by one or more processors of a device, cause the device to perform the method of one or more Aspects of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, first signaling identifying a first mode for a network communication procedure, wherein the first mode includes a paging procedure, wherein the paging procedure is associated with a first paging radio network temporary identifier (P-RNTI);
      receive, from the network node, second signaling associated with the network communication procedure, in accordance with the first mode, that indicates for the UE to switch to a second mode for the network communication procedure, wherein the second mode is based at least in part on support for the second mode indicated in a system information block (SIB), and wherein the second mode includes a second paging procedure, wherein the second paging procedure is associated with a second P-RNTI; and
      in response to receipt of the second signaling, perform the switch to using the second mode.

2. The UE of claim 1,
   wherein the one or more processors are further configured to:
      receive, in the SIB, information identifying support for the second mode.

3. The UE of claim 1,
   wherein the first mode and the second mode differ with regard to at least one of:
      a set of P-RNTIs,
      a set of time resources,
      a set of frequency resources,
      a set of paging occasions,
      a set of paging sub-groups, or a repetition parameter for a paging beam.

4. The UE of claim 1,
   wherein the one or more processors are further configured to:
      monitor a paging radio network temporary identifier for a paging message or a short message to receive the first signaling.

5. The UE of claim 1,
   wherein the first signaling is a downlink control information or a short message that includes a bit indicator identifying the second mode.

6. The UE of claim 1,
   wherein the switch to the second mode is based at least in part on at least one of a paging rate, a blocking rate, or a paging delay.

7. The UE of claim 1,
   wherein the one or more processors are further configured to:
      monitor for a paging radio network temporary identifier associated with the first mode when using the second mode.

8. The UE of claim 1,
   wherein the first mode and the second mode are associated with a common paging message in a downlink shared channel.

9. The UE of claim 1,
   wherein the one or more processors are further configured to:
      determine that a threshold period of time has elapsed for receiving a paging downlink control information or a short message; and
      fall back to the first mode.

10. A method of wireless communication performed by a user equipment (UE), comprising:
    receiving, from a network node, first signaling identifying a first mode for a network communication procedure, wherein the first mode includes a paging procedure, wherein the paging procedure is associated with a first paging radio network temporary identifier (P-RNTI);
    receiving, from the network node, second signaling associated with the network communication procedure, in accordance with the first mode, that indicates for the UE to switch to a second mode for the network communication procedure, wherein the second mode is based at least in part on support for the second mode indicated in a system information block (SIB), and wherein the second mode includes a second paging procedure, wherein the second paging procedure is associated with a second P-RNTI; and
    in response to receipt of the second signaling, performing the switch to using the second mode.

11. The method of claim 10, further comprising:
    receiving, in the SIB, information identifying support for the second.

12. The method of claim 10,
    wherein the first mode and the second mode differ with regard to at least one of:
       a set of P-RNTIs,
       a set of time resources,
       a set of frequency resources,
       a set of paging occasions,
       a set of paging sub-groups, or
       a repetition parameter for a paging beam.

13. The method of claim 10, further comprising:
    monitoring a paging radio network temporary identifier for a paging message or a short message to receive the first signaling.

14. The method of claim 10,
wherein the first signaling is a downlink control information or a short message that includes a bit indicator identifying the second mode.

15. The method of claim 10,
wherein the switch to the second mode is based at least in part on at least one of a paging rate, a blocking rate, or a paging delay.

16. The method of claim 10, further comprising:
monitoring for a paging radio network temporary identifier associated with the first mode when using the second mode.

17. The method of claim 10,
wherein the first mode and the second mode are associated with a common paging message in a downlink shared channel.

18. The method of claim 10, further comprising:
determining that a threshold period of time has elapsed for receiving a paging downlink control information or a short message; and
falling back to the first mode.

19. A non-transitory computer-readable medium storing a set of instructions for wireless communication, the set of instructions comprising:
one or more instructions that, when executed by one or more processors of a user equipment (UE), cause the UE to:
receive, from a network node, first signaling identifying a first mode for a network communication procedure, wherein the first mode includes a paging procedure, wherein the paging procedure is associated with a first paging radio network temporary identifier (P-RNTI);
receive, from the network node, second signaling associated with the network communication procedure, in accordance with the first mode, that indicates for the UE to switch to a second mode for the network communication procedure, wherein the second mode is based at least in part on support for the second mode indicated in a system information block (SIB), and wherein the second mode includes a second paging procedure, wherein the second paging procedure is associated with a second P-RNTI; and
in response to receipt of the second signaling, perform the switch to using the second mode.

20. The non-transitory computer-readable medium of claim 19,
wherein the one or more instructions further cause the UE to:
receive, in the SIB, information identifying support for the second mode.

21. The non-transitory computer-readable medium of claim 19,
wherein the first mode and the second mode differ with regard to at least one of:
a set of P-RNTIs,
a set of time resources,
a set of frequency resources,
a set of paging occasions,
a set of paging sub-groups, or
a repetition parameter for a paging beam.

22. The non-transitory computer-readable medium of claim 19,
wherein the one or more instructions further cause the UE to:

monitor a paging radio network temporary identifier for a paging message or a short message to receive the first signaling.

23. The non-transitory computer-readable medium of claim 19,
wherein the first signaling is a downlink control information or a short message that includes a bit indicator identifying the second mode.

24. The non-transitory computer-readable medium of claim 19,
wherein the switch to the second mode is based at least in part on at least one of a paging rate, a blocking rate, or a paging delay.

25. The non-transitory computer-readable medium of claim 19,
wherein the one or more instructions further cause the UE to:
monitor for a paging radio network temporary identifier associated with the first mode when using the second mode.

26. The non-transitory computer-readable medium of claim 19,
wherein the first mode and the second mode are associated with a common paging message in a downlink shared channel.

27. The non-transitory computer-readable medium of claim 19,
wherein the one or more instructions further cause the UE to:
determine that a threshold period of time has elapsed for receiving a paging downlink control information or a short message; and
fall back to the first mode.

28. An apparatus for wireless communication, comprising:
means for receiving first signaling identifying a first mode for a network communication procedure, wherein the network communication procedure includes a paging procedure, wherein the paging procedure is associated with a first paging radio network temporary identifier (P-RNTI);
means for receiving second signaling associated with the network communication procedure, in accordance with the first mode, that indicates for the apparatus to switch to a second mode for the network communication procedure, wherein the second mode is based at least in part on support for the second mode indicated in a system information block (SIB), and wherein the second mode includes a second paging procedure, wherein the second paging procedure is associated with a second P-RNTI; and
means for performing the switch to using the second mode.

29. The apparatus of claim 28, further comprising:
means for receiving, in the SIB, information identifying support for the second mode.

30. The apparatus of claim 28,
wherein the first mode and the second mode differ with regard to at least one of:
a set of P-RNTIs,
a set of time resources,
a set of frequency resources,
a set of paging occasions,
a set of paging sub-groups, or
a repetition parameter for a paging beam.

* * * * *